United States Patent
Söderqvist

[15] 3,657,819
[45] Apr. 25, 1972

[54] DENTAL SOAKING FOR SOAKING WATER, BLOOD, SALIVA, AND THE LIKE, FROM THE MOUTH OF PATIENTS

[72] Inventor: Karl Gustav Söderqvist, Hagersten, Sweden

[73] Assignee: Dentalaktiebolaget, Stockholm, Sweden

[22] Filed: Jan. 23, 1970

[21] Appl. No.: 5,290

[30] Foreign Application Priority Data

Feb. 14, 1969 Sweden................................2093/69

[52] U.S. Cl. ...............................................................32/33
[51] Int. Cl. .........................................................A61c 17/04

[58] Field of Search.........................................................32/33

[56] References Cited

UNITED STATES PATENTS 3,484,941  12/1969  Svard........................................32/33
3,476,144  11/1969  Krantz.......................................32/33

Primary Examiner—Robert Peshock
Attorney—Sommers & Young

[57] ABSTRACT

The invention relates to a dentist's soaking apparatus, comprising a separation tank for separating suction air and blood, water, etc., a valve means being provided in a suction conduit and switchable between two positions by means of a control conduit.

3 Claims, 2 Drawing Figures

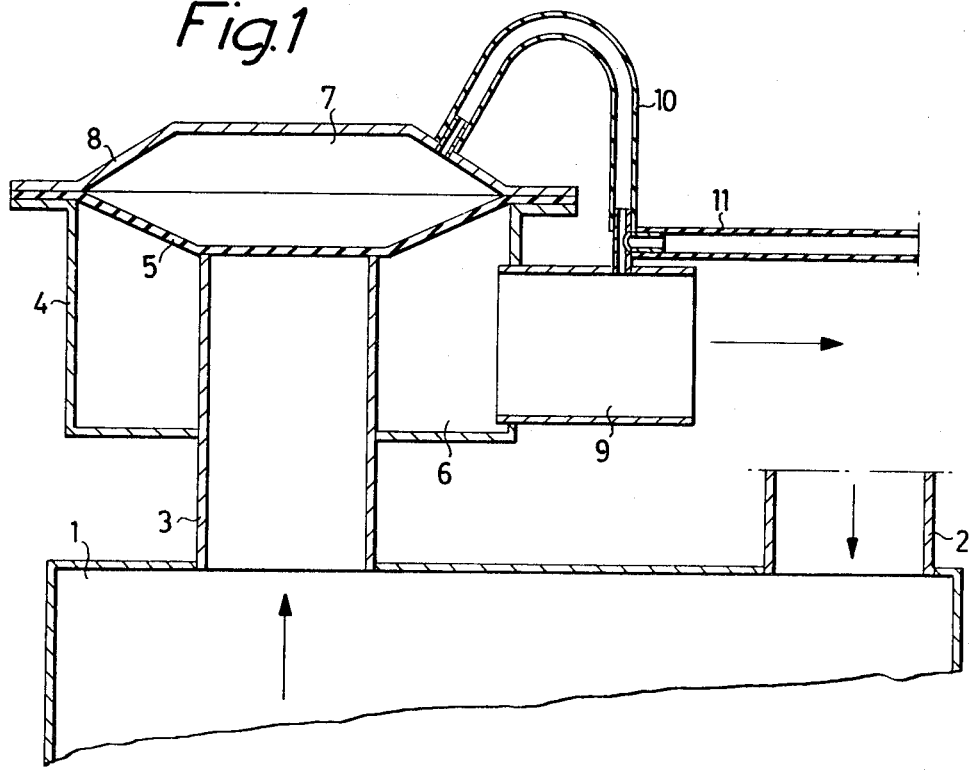
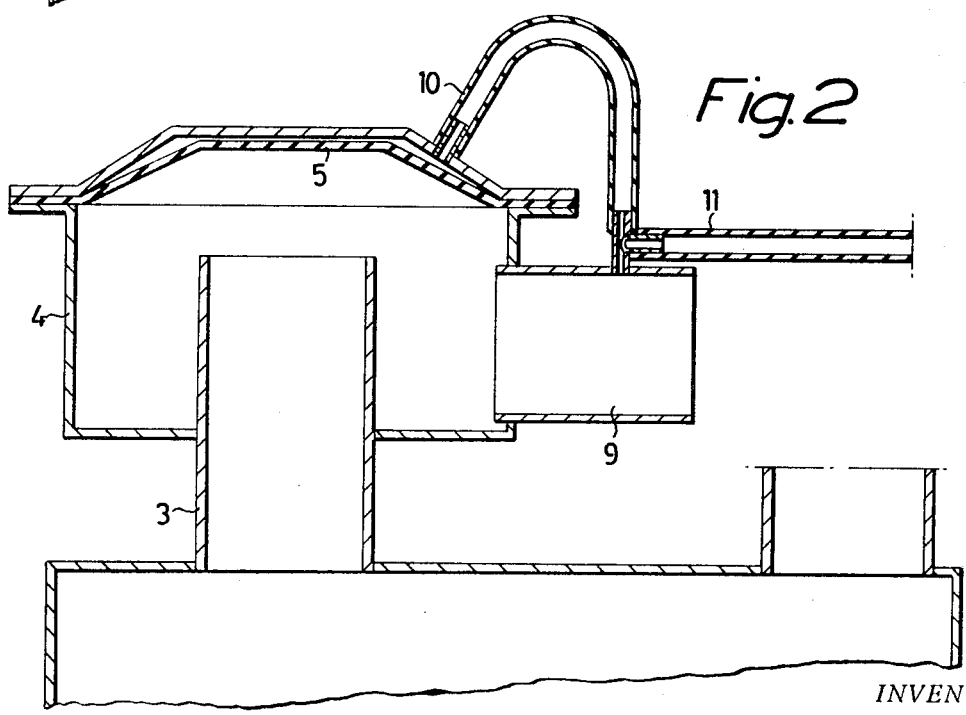

DENTAL SOAKING FOR SOAKING WATER, BLOOD, SALIVA, AND THE LIKE, FROM THE MOUTH OF PATIENTS

In modern dental working a specific soaking device is used more and more frequently in order to soak away water, blood, saliva, tooth substance, and the like, from the mouth of patients.

A great number of such soaking devices are previously known. One of the most common devices includes a separation tank located close to the patient's chair or the dentist table, water and solid particles being separated from the suction air in the separation tank. The dry air is then sucked from the separation tank through a conduit to a suction fan located remote from the tank. As soon as the suction fan motor has been turned off the negative pressure of the separation tank is removed, thereby enabling a foot-valve or drain valve — which has till then been closed by the negative pressure — to open and pour out the fluid being collected in the separation tank whereas the solid particles are collected in a filter.

When using a central system serving several dentist locations or several dentist rooms, said central system thus utilizing only one common suction fan and motor, the motor cannot be turned off in order to empty the separation tank of a separate dentist location or a separate dentist room, respectively. In said central system each separate suction conduit leading from a separate separation tank is instead provided with an individual cut-off valve being manually or electromagnetically controllable. Upon closure of one of said individual valves a pressure equalization takes place in corresponding separation tank and the separation tank is emptied. However, said known central system has a number of disadvantages.

The known system is based on use of low vacuum and, thus, a great amount of air is used. Hence heavy conduits and, accordingly, large passages in the individual valves are necessary. When operating the valves manually, valve levers must be provided in every separate valve location, and in utilizing magnetic valves said levers tend to become excessively heavy. When utilizing magnetic valves a low voltage of 12 volts must be applied, this being due to safety reasons, thereby necessitating the provision of a transformer. The installation of the separate valves is both bulky and costly.

The object of the present invention is to eliminate the hereinbefore mentioned disadvantages by providing a valve system controlled by the negative pressure and installable directly on the cover lid of the separation tank, said system requiring a minimum of space.

In accordance with the invention there is provided a soaking system, including a separation tank provided with a connection piece for a soaking conduit leading a mixture of suction air and water, blood, etc., a bottom outlet for separated fluid and a connection piece for a suction conduit leading to a suction fan and conducting separated air, the bottom outlet being provided with a foot-valve controlled by the negative pressure in the separation tank, and the suction conduit leading from the separation tank being provided with a valve for cutting off said suction conduit in order that the foot-valve may be opened.

According to one object of the invention there is provided a dental soaking system comprising a valve disposed in the suction conduit leading from the separation tank, said valve being provided with a valve element which is activated in response to the negative pressure in the suction conduit emanating from the separation tank, this function being due to the fact that the negative pressure in said suction conduit can be switched between two values by a control conduit leading to the dentist table, one value of which corresponding to a condition where the valve element is blocking the suction conduit, and the other value corresponding to open suction conduit. Other objects of the invention will appear from the following claims. An embodiment of the invention is schematically illustrated in the accompanying drawing, wherein:

FIG. 1 is a schematic representation of the upper portion of a separation tank, the associated valve means being shown in closed position; and FIG. 2 depicts the valve means in open position.

In the drawing 1 denotes the separation tank having an inlet connection piece 2 mounted thereon and connectable to a soaking conduit from a dentist location, the soaking conduit leading a mixture of water, blood, saliva, tooth substance, etc. 3 denotes an outlet connection piece mounted on the separation tank and intended to conduct the dry air away from the separation tank in which solid material and fluid has been separated. The dry air is sucked away through a central fan (not shown). As is known, the separation tank is provided with a filter means for the solid material, and with a foot-valve (not shown) controlled by the negative pressure and intended to pour out the fluid.

A valve housing 4 is disposed on the outlet connection piece 3. The housing 4 is divided by a diaphragm 5 into a lower compartment 6 and an upper compartment 7, the latter being covered by a cover lid 8. The outlet connection piece 3 protrudes into the valve housing. The housing 4 has an outlet connection piece 9 for a suction conduit leading to a suction fan (not shown). The upper compartment 7 is communicating with the outlet connection piece 9 through a connecting conduit 10 consisting of a hose. The connecting conduit 10 can be connected to directly communicate with the atmosphere, either by means of a small valve being distance controlled from the dentist location by negative pressure, for instance, or by providing the connecting conduit 10 with a normally open control hose 11, one end of which emerging directly into the connecting conduit 10, and the other of which being located at the dentist table and intended to be blocked by the dentist when he seizes the nozzle of the soaking conduit connected to the inlet connection piece 2.

In FIG. 2 the control conduit 11 is illustrated in its open position. Due to suction by the suction fan via outlet connection piece 9 a negative pressure is generated in the compartment 6 beneath the diaphragm 5, the negative pressure urging the diaphragm against the end of the connection piece 3 and blocking the outlet from there, thereby removing the negative pressure from the separation tank in order that the foot-valve may be opened. The condition thus established corresponds to a position when the dentist is not using the soaking nozzle.

In FIG. 2 the control conduit 11 is blocked at the dentist location when the dentist is using the soaking nozzle. Then a negative pressure is established in the connecting conduit 10 and the compartment 7, said negative pressure acting on the entire upside of the diaphragm, thereby sucking the diaphragm upwards in order that the connection pieces 3 and 9 may communicate with each other, and, hence, the dry air proceeds to the central fan where it is exhausted.

Although the invention has been developed especially in order to be utilized in central soaking systems, it can also be utilized in a soaking system serving only one dentist location.

I claim:

1. In an apparatus for removing water, blood, saliva, tooth substance, etc. from the mouth of a patient, including, separation tank means for separating air, liquids and solids, a first suction conduit means operatively connected to said separation tank for drawing water, blood, saliva and tooth substance into said separation tank, and a second suction conduit means operatively connected to said separation tank and leading to a source of suction for drawing separated air from said separation tank, the improvement, comprising; vacuum-responsive, two-position valve means operatively mounted in said second suction conduit for closing said second suction conduit to the source of suction in a first of said two positions and for opening said second suction conduit to the source of suction in a second of said two positions and control means operatively connected to said valve means for switching the source of suction from one operating mode of said valve where said valve is in said first position to a second operating mode of said valve where said valve is in said second position.

2. Apparatus in accordance with claim 1 wherein the valve means includes a housing and a diaphragm separating said housing into an upper compartment and a lower compartment, the second suction conduit includes a first section in open communication with the separation tank and protruding into said lower compartment of said valve housing and a second section in open communication with said lower compartment of said valve housing and leading to the source of suction, and the control means includes a third conduit in open communication with said upper compartment of said valve housing and said second section of said second conduit and a fourth conduit in open communication with said third conduit and with the atmosphere.

3. Apparatus in accordance with claim 2 wherein the fourth conduit comprises a hose adapted to be closed to the atmosphere by the operater.

* * * * *